April 28, 1959 F. O. E. SCHULTZ 2,883,997
RELAY VALVES
Filed Dec. 27, 1954 4 Sheets-Sheet 1

INVENTOR.
FORREST O. E. SCHULTZ
BY
ATTORNEY.

April 28, 1959 F. O. E. SCHULTZ 2,883,997
RELAY VALVES
Filed Dec. 27, 1954 4 Sheets-Sheet 2
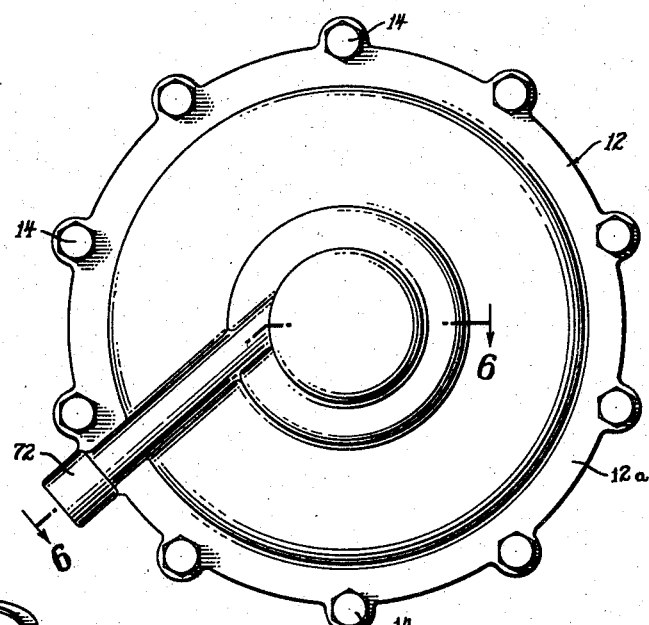
Fig. 3
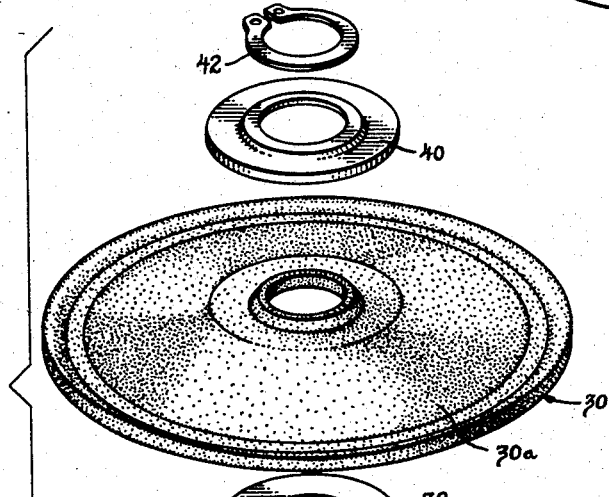
Fig. 5
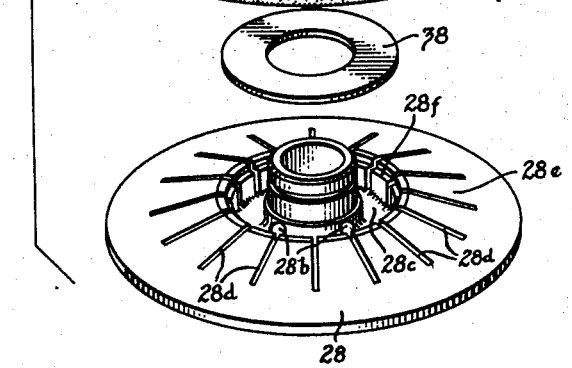
INVENTOR.
FORREST O. E. SCHULTZ
BY
*John W. Pease*
ATTORNEY.

INVENTOR.
FORREST O. E. SCHULTZ
BY
*John W. Pease*
ATTORNEY.

INVENTOR.
FORREST O. E. SCHULTZ

United States Patent Office 2,883,997
Patented Apr. 28, 1959

2,883,997

RELAY VALVES

Forrest O. E. Schultz, Detroit, Mich., assignor to The Midland Steel Products Company, Cleveland, Ohio, a corporation of Ohio Application December 27, 1954, Serial No. 477,652

11 Claims. (Cl. 137—102)

My invention relates to improvements in air relays and, more particularly, to air relays for controlling fluid pressure in one or more motor cylinders. The invention is particularly useful in the control and operation of fluid pressure brakes and for the purpose of disclosure will be described with respect to such application, it being understood that the invention is useful to other applications; as, for example, the control of clutch mechanism operated from one or more motor cylinders.

Heretofore, air brake relays for controlling a plurality of brake cylinders from an air reservoir, a supply line and a control line have included a three-piece housing having two flange sections for bolting the housing together and a plurality of ports adapted for connection of the relay to the reservoir, the supply line, the control line and the plurality of brake cylinders.

To service the expendible valve elements in such a relay, it is necessary to disconnect the several lines mentioned above and remove approximately six bolts from each of the two flange sections. This is a time consuming and laborious task.

It is an object of my invention to provide an air relay in which the expendible valve elements are more readily serviceable.

A further object of my invention is to provide an improved quick application and release valve device for controlling fluid pressure brakes.

A still further object is to provide in an application and release valve device an arrangement requiring minimum force to actuate the inlet and exhaust valves and thereby reduce the lap range.

A further object is to provide in such a valve means preventing hunting and over-correction in a relay valve.

A further object of my invention is to provide an improved, simple and reliable air brake relay.

A further object is to provide in an application and release valve an arrangement improving the speed of response of the valve.

Further objects and advantages will be apparent from the following description and accompanying drawings of a preferred embodiment of my invention, in which:

Figure 3 is a plan view, taken from the top side of Figure 1;

Figure 5 is an exploded view of an exhaust valve and valve actuator assembly of the relay, shown in Figure 1;

Figure 7:
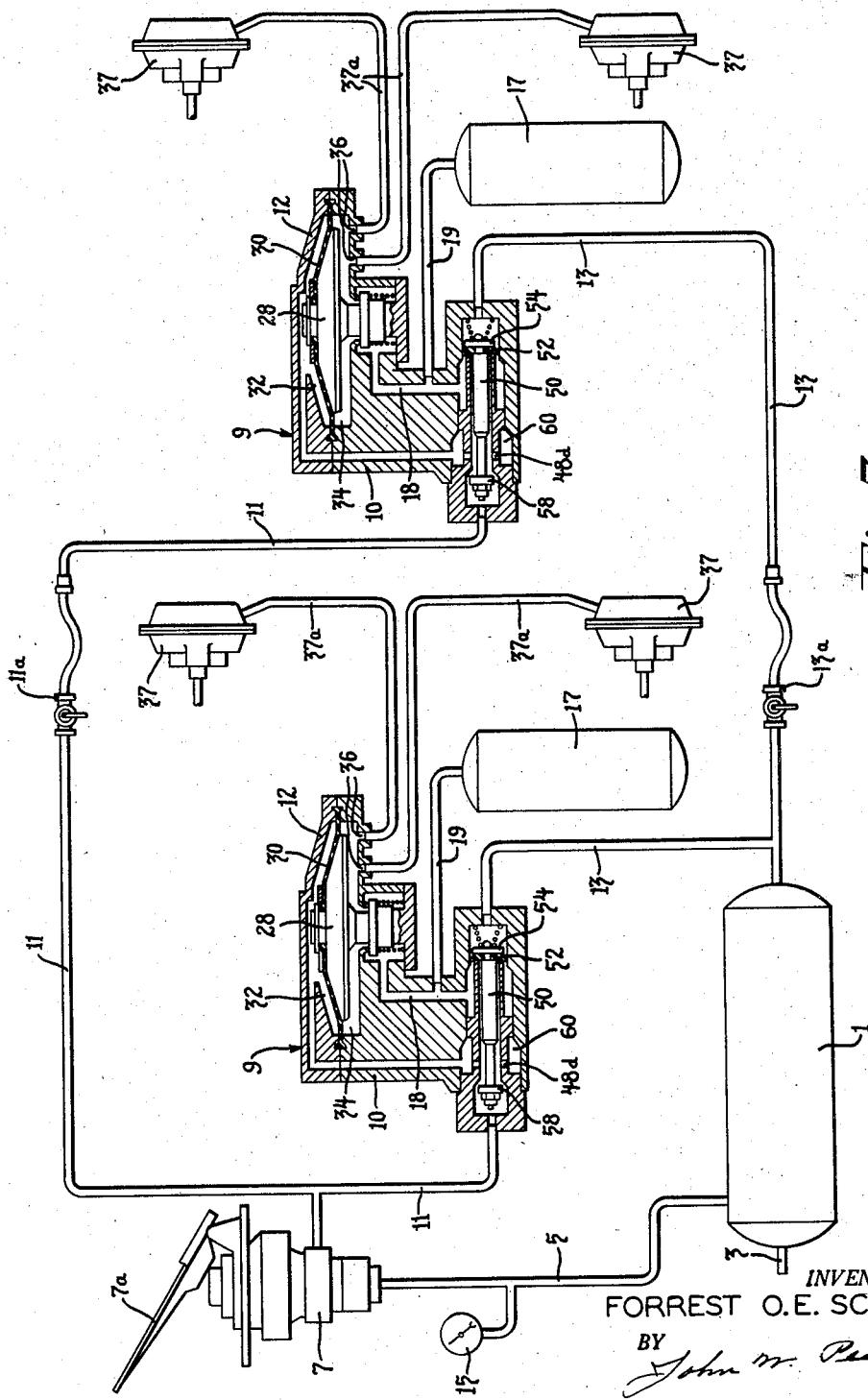
Figure 7 is a diagrammatic view illustrating the general arrangement of a tractor-trailer air brake system embodying the relay shown in detail in Figures 1 to 6 inclusive.

Referring to Figure 7 for the moment there is illustrated diagrammatically a tractor trailer brake system embodying my relay device 9 and showing the manner of connecting the same in the system. Briefly fluid pressure for the system is obtained from a pressure source here indicated as a main reservoir 1 having a charging connection 3 usually connected to a fluid pressure pump (not shown). Fluid under pressure is passed by a conduit 5 to a conventional treadle valve 7 for distribution by control lines 11 to a pair of my relay devices 9 each serving a pair of brake chambers 37 associated with the particular relay and connected thereto by branch lines 37a. The treadle valve 7 operates responsive to depression of a pedal 7a to pass fluid pressure from the reservoir 1 to the supply lines 11 and on release of the pedal to exhaust the lines 11 to atmosphere. Fluid pressure from reservoir 1 is supplied directly to relays 9 by supply lines 13. Auxiliary reservoirs 17 are connected by lines 19 each to the relay 9 associated therewith. The same numeral has been used to identify similar lines and devices connected to the respective relays 9 since the relays are identical and only one will be described in detail hereinafter. A pressure gauge 15 is connected in communication with the main reservoir 1 to indicate the pressure therein and quick coupling means 11a and 13a are provided to couple the truck and trailer sections of the respective control lines 11 and supply lines 13.

Referring more particularly to the drawings, there is fully illustrated, in Figures 1 to 6, the air relay device 9 illustrative of my invention in a form presently preferred. In general, the relay comprises a housing, a supply valve cartridge detachably connected in the housing and arranged to control the admission of fluid under pressure to the housing, differential pressure responsive means for actuating the supply valve as well as controlling the exhaust of fluid under pressure from fluid brake cylinders 37, and a detachable emergency valve cartridge cooperative with the above mentioned structure to isolate the relay from the control line 11 and supply line 13 responsive to loss of pressure in the latter, and apply fluid pressure to the brake cylinders 37 from air reservoir 17.

Figure 1:
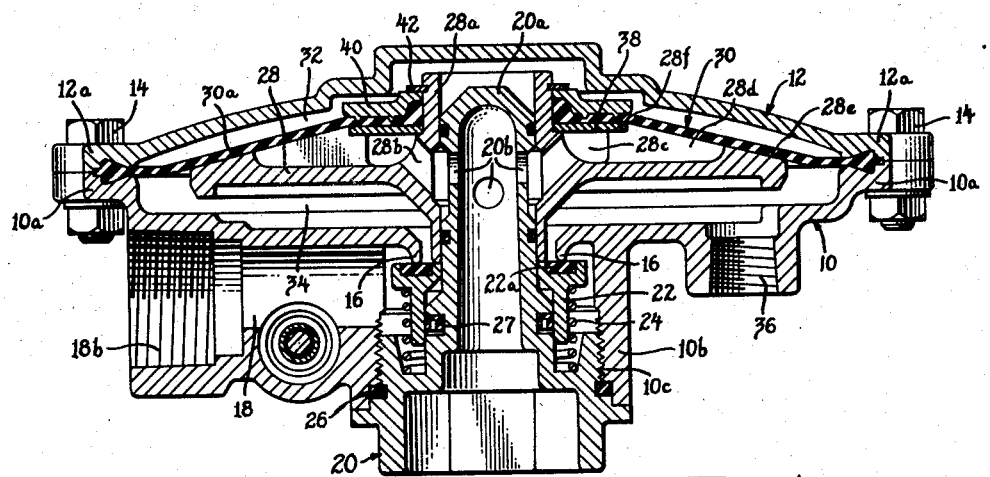
Figure 1 is a side cross-sectional view of a relay, illustrative of my invention.
Figure 2:
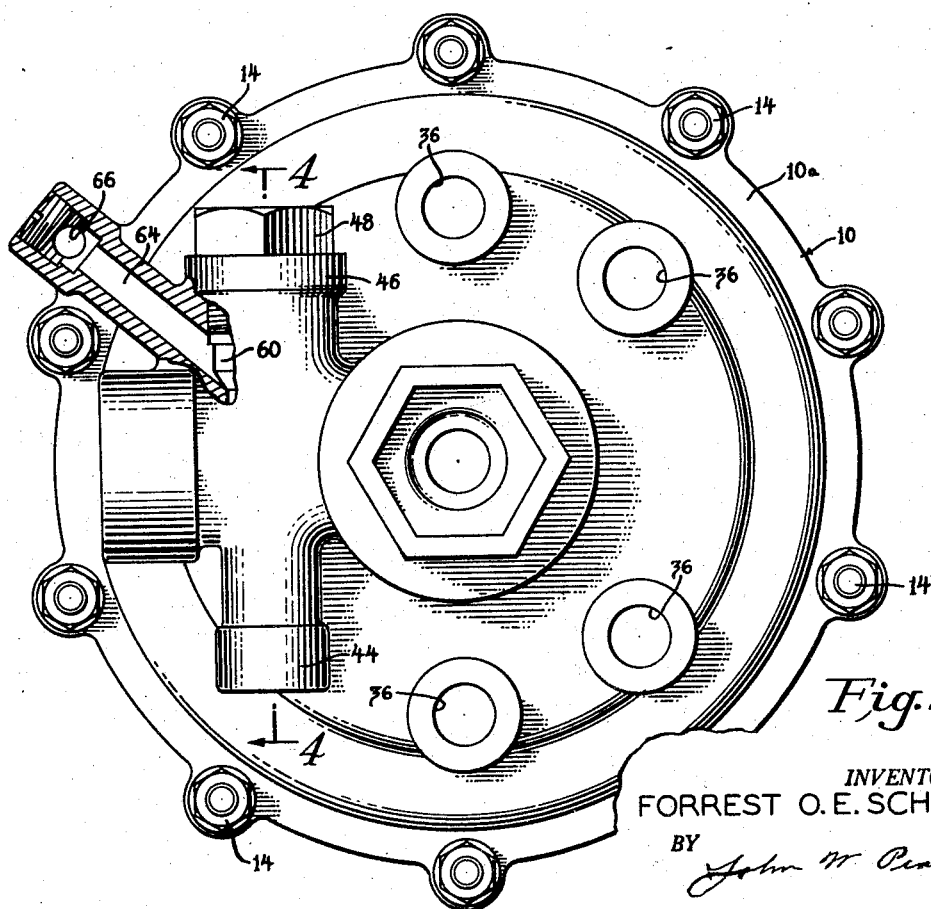
Figure 2 is a plan view, taken from the under side of Figure 1.

Referring now to Figures 1–3 and 7 of the drawings in detail, the housing includes a base 10 having a flange portion 10a and a cover 12 having a flange portion 12a secured to the base by a plurality of bolts and nuts 14, or other suitable means. Formed on the lower portion of the base 10, as viewed in Figure 1, is a downwardly projecting cylindrical boss 10b having a hollow interior threaded adjacent its lower end at 10c. Also formed in the base 10, adjacent the upper end of the boss 10b and concentrically spaced from the interior thereof, is a downwardly projecting annular lip 16 forming a valve seat in the base. In communication with the interior of the cylindrical boss 10b is a laterally disposed reservoir passage 18 formed in the base 10 and threaded adjacent its outer extremity, as at 18b, for connection to the air reservoir 17 by the line 19 or other suitable means.

To control the supply of fluid under pressure from the reservoir 17 to the interior of the housing 10—12, I provide a supply valve cartridge including a hollow elongated body or guide-member 20 and an annular supply valve 22 slidably positioned on the guide-member 20 and biased by a compression spring 24 to engage the valve seat 16 in the base 10. A ring 22a of rubber or other suitable material is fixed in an annular groove in the supply valve facing the valve seat 16 to provide an effective seal in closed position of the valve.

One end of the guide-member 20 is closed, as at 20a, and its other end is provided with a threaded periphery to cooperate with threads 10c in the base in detachably securing the supply valve cartridge in the housing 10—12. A seal 26 between the guide-member 20 and base 10, and a seal 27 between the valve 22 and guide-member 20 are provided, respectively, to prevent the passage of fluid pressure from the reservoir passage 18 to atmosphere and from the passage 18 around the supply valve 22 to the interior of the housing.

To actuate the supply valve 22 and to control the exhaust of fluid under pressure from the housing 10—12, I provide an exhaust valve and valve actuator assembly comprising a valve actuator 28 and a flexible diaphragm 30. The valve actuator 28 is formed as an annular member having a hub portion 28a slidably positioned on the guide-member 20 and engageable with the supply valve 22 to actuate the same. The diaphragm 30 is also formed as an annular member of greater diameter than the diameter of said actuator, having its inner periphery secured to the hub 28a, its outer periphery secured between the flanges 10a—12a of the housing 10—12 and an intermediate flexible portion 30a engageable with the upper surface of the actuator member.

The diaphragm 30, valve actuator 28 and supply valve cartridge 20—22 define in said housing a control chamber 32 and a reaction chamber 34. The base 10 of the housing is formed with a plurality of delivery ports threaded, as at 36, for connecting the reaction chamber in communication with the associated pair of brake cylinders 37. If desired, a single delivery port could be used to supply a single brake cylinder or, with appropriate connections, a plurality of brake cylinders.

In operation, to apply fluid under pressure to the brake cylinders 37, fluid under pressure is admitted to the control chamber 32 by way of the treadle valve 7 and control lines 11. The control chamber pressure acts on the diaphragm 30 to slide the valve actuator 28 downward to engage and open the supply valve 22 to allow fluid under pressure to pass from the reservoir 17 through passage 18 to the reaction chamber 34. When the fluid pressure in the reaction chamber begins to exceed the control chamber pressure, the diaphragm 30 moves upward under fluid differential pressure, allowing the supply valve 22 to close and be maintained closed responsive to the differential of fluid pressure in the reservoir passage 18 and the reaction chamber 34 acting on an area of the supply valve 22 defined by the diameters of the valve seat 16 and the internal diameter of the supply valve 22 adjacent the seal 27. The above mentioned diameters are selected to define an area sufficient to just maintain minimum closing force on the valve 22. Therefore, minimum force is required to open the valve. The return spring 24 is required to have a rating sufficient merely to overcome friction of the supply valve on the guide-member, thereby permitting the use of a spring of minimum rating, which lowers manufacturing cost and reduces space limitations.

When an increase in brake pressure is required, the pressure in the control chamber 32 is increased and the above recited operation is repeated until the pressure in the reaction chamber 34 again equals the control pressure and the valve actuator moves to lap position.

An advantage of the diaphragm and valve actuator assembly described above is the maximum utilization of the area of the diaphragm 30 within the housing 10—12 for response to differential fluid pressure thereon to open the supply valve 22. That is, the differential pressure required on the diaphragm 30 to open the valve 22 is directly proportional to the effective pressure responsive area of the diaphragm. By increasing such effective area lower fluid pressure differential is required to open the supply valve and the lap range of the valve is thereby lowered.

To reduce the brake pressure by exhausting fluid under pressure from the reaction chamber, the guide-member 20 is formed with ports 20b adjacent the hub 28a of the valve actuator 28 and the valve actuator is formed with passageways through the hub and terminating in radially disposed openings in the face of actuator 28, adjacent the diaphragm 30.

Figure 6:
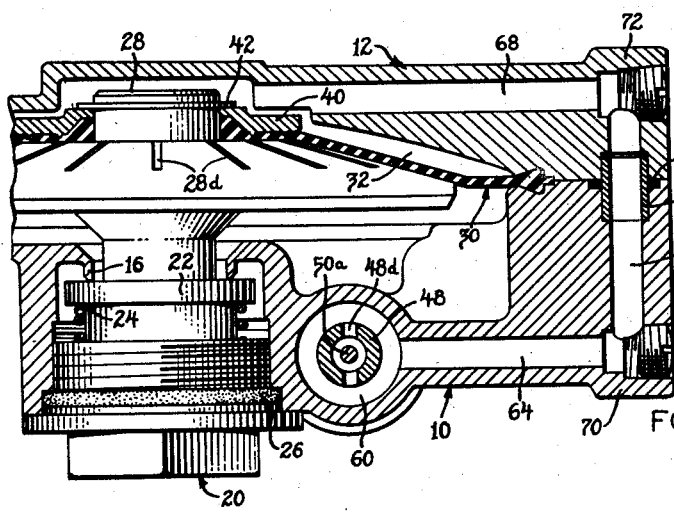
Figure 6 is an enlarged cross-sectional view taken on the line 6—6 of Figure 3.

More particularly, referring to Figures 1, 5 and 6, and particularly Figure 5, in a preferred embodiment of my invention, the actuator 28 is formed with a plurality of apertures 28b, an annular recess 28c adjacent the apertures 28b, and a plurality of radially disposed slots 28d extending from the recess 28c to the face 28e of the valve actuator adjacent the diaphragm 30. A washer 38 is supported on an annular shoulder 28f formed on the actuator 28 to aid a washer 40 in securing the inner periphery of the diaphragm 30 to the hub 28a. A snap ring 42, accommodated in an annular groove in the hub 28a, secures the washer in pressed relation on the diaphragm 30.

In operation, as pressure is reduced in the control chamber 32 the differential pressure acting on the diaphragm 30 lifts the flexible portion 30a of the diaphragm to uncover all or a portion of the aperture area of the slots 28d and thereby to serve as an exhaust valve to exhaust fluid brake pressure from the reaction chamber 34 through the passageways 28b in the valve actuator 28 and the hollow interior of the guide-member 20 to atmosphere, this action continuing until the pressure in the reaction chamber 34 equals the pressure in the control chamber, at which point the diaphragm closes on the valve actuator to seal the passages through the valve actuator.

One important advantage of the above described exhaust arrangement is the fact that the valve actuator does not move from lap position on operation of the exhaust valve. That is, the valve actuator 28 remains stationary and the flexible diaphragm moves upward away from the valve actuator. Thus, there is no problem of inertia with respect to moving the valve actuator; also, the conventional return valve spring is not required. The diaphragm itself flexes to discharge position on a few ounces of differential pressure, thereby reducing the lap range of the valve and providing an exhaust valve more rapid in response to variation in control pressure, both features important in relay valves.

Another important aspect of my invention is the provision of radially disposed apertures in the diaphragm face of the valve actuator to control the rate of discharge of fluid under pressure from the reaction chamber to exhaust. For example, in response to a slight reduction in pressure in the control chamber 32 amounting, to say, a few ounces, not all of the port area of the slots 28d is uncovered. On the contrary, the diaphragm 30 lifts from the actuator 28 progressively from the outer edge of the actuator 28 to uncover a port area of the slots commensurate with the differential pressure acting on the diaphragm. On the other hand, when a variation in control pressure requires the exhaust of a large volume of air to equalize the pressures in the reaction and control chamber, the high differential pressure across the diaphragm 30 lifts the diaphragm clear of the full port area of the slots and rapidly exhausts the fluid to quickly equalize the pressures on the diaphragm. Thus, in effect, the above arrangement provides in an exhaust valve a simple, variable orifice means responsive to the value of differential pressure thereon, and avoids over-correction or hunting of the exhaust and intake valves while, at the same time, providing for quick dump action when required. Such over-correction or hunting in an air valve results in unnecessary wear on the valve and the establishment of harmonics, resulting in a whistle or hum of the valve.

It should be noted that while I have illustrated and described slots in the preferred embodiment of my invention, a plurality of apertures radially spaced from the axis of the hub 28a or other suitable means cooperative with the diaphragm will have a satisfactory result in establishing a variable orifice means.

Another advantage of the diaphragm and valve actuator assembly is its ready, slidable removal as a unit from the guide-member 20 after removal of the cover plate 12 for servicing. It is not necessary to remove the relay housing proper, that is the base portion 10, from the vehicle to which it is mounted. Nor is it necessary to remove a single line connected to the relay. Also, since in the released position of the brakes there is no pressure in either the control chamber 32 nor the reaction chamber 34, removal and replacement of the diaphragm and valve actuator assembly does not entail loss of fluid pressure in the system.

Referring now to Figures 1–3 and 7, to supply control pressure to the control chamber 32 and replenish the supply of fluid under pressure in the reservoir 17 I provide, formed in the base 10 of the housing 10—12, oppositely disposed aligned hollow boss sections 44 and 46 normal to the longitudinal axis of the reservoir passage 18 and in communication therewith, to form an emergency valve chamber. The boss 44 is threaded adjacent its open end, as at 44a (see Figure 4) for connection to the supply line 13 and boss 46 is threaded adjacent its open end, as at 46a, for detachably securing in the emergency valve chamber an emergency valve body 48 forming part of an emergency valve cartridge.

Figure 4:
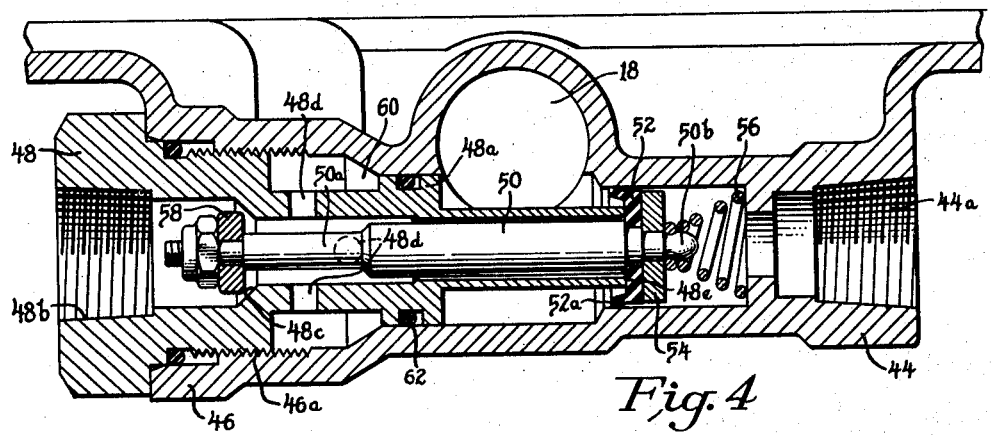
Figure 4 is a cross-sectional view taken on the line 4—4 of Figure 2, and showing in detail an emergency valve cartridge in normal position of the valve.

Referring to Figure 4 in detail, the emergency valve cartridge comprises the valve body 48 and a combination check and by-pass valve means, including a valve-stem 50 having opposite ends of reduced cross-section 50a and 50b, a flexible check-valve 52, backing-plate 54 and return spring 56 fixed to end 50b of the valve-stem 50, and a normally open control line valve 58 fixed to end 50a of the valve-stem 50.

The emergency valve body 48 is formed with a flange portion 48a engaging the internal periphery of the emergency valve chamber on the control line side thereof and defining an annular control line chamber 60. An annular seal 62, accommodated in an annular groove of the flange 48a, is provided to prevent the passage of fluid under pressure from the reservoir passage 18 to the annular chamber 60. Communication between the annular chamber 60 and the control chamber 32 of the housing 10—12 is provided by passageways 64, 66 and 68 (see Figure 6) formed in boss-sections 70 and 72 formed, respectively, in the base 10 and cover 12 of the housing 10—12 at an angle (see Figure 2) to the longitudinal axis of the emergency valve chamber. A sleeve 74 and seal 76 are provided to avoid leakage from the passage 66.

The control line end of the emergency valve body is threaded, as at 48b, for attachment to the control line 11 to admit control line fluid past an inwardly directed valve seat 48c and through radial apertures 48d formed in the body 48 to the annular chamber 60, from which the fluid passes to the control chamber chamber 32 of the housing 10—12 through the passageways 64, 66 and 68, above described.

The central portion of the valve-stem 50 is of lesser diameter than and slidably guided in a portion of reduced cross-section of the hollow emergency valve body 48, to allow fluid under pressure to pass from the reservoir passage 18 to the annular chamber 60. Other suitable means can be used to allow fluid to pass between the valve-stem 50 and the interior of the body 48, as, for example, longitudinal grooves in the valve-stem 50, or the forming of the valve-stem in hexagonal shape.

The check-valve 52 has formed thereon an inwardly directed annular lip portion 52a flexible radially away from the interior periphery of the body 48 to pass fluid under pressure from the supply line 13 to the reservoir passage 18 and flexible to engagement with the above mentioned periphery to prevent the passage of fluid under pressure from the reservoir passage 18 to the supply line on loss of pressure in the latter.

The check-valve 52 also acts as a differential pressure responsive means to hold the control valve 58 off its seat 48c in the body 48 to admit fluid from the control line 11 to the control chamber 32, and to close against the internal open end 48e of the body 48 to prevent the passage of fluid pressure from the reservoir 18 between the valve-stem 50 and the hollow interior of body 48 on to the control chamber 32. The above described is the normal operating position of the valve means in the emergency valve cartridge, and is shown in Figure 4.

Figure 4A:
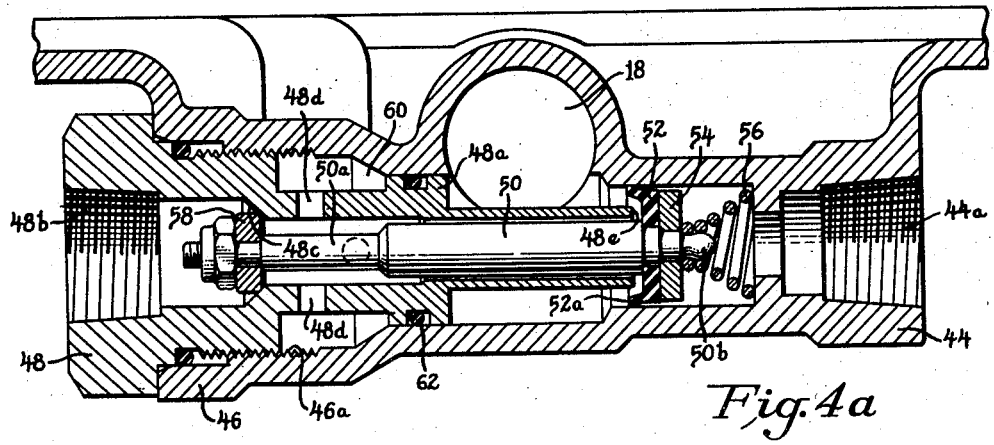
Figure 4a is a cross-sectional view, similar to Figure 4, showing the emergency position of the valve.

Under emergency conditions, as on breakaway or any condition under which fluid pressure in the supply line 13 is lost, the fluid pressure from the reservoir passage 18 forces the check-valve 52 slidably to the right, that is—to the position shown in Figure 4a, moving the valve-stem 50 to the right to close the control valve 58 and seal off the control line 11, as well as the supply line 13, which is sealed off by the check-valve itself. Also, as the check-valve 52 moves to the right it uncovers the end 48e of the body 48 to allow fluid pressure from the reservoir passage 18 to pass to the control chamber 32 and apply full pressure in the brake chambers 37. It should be noted in Figure 4 that the fluid pressure working area of the valve 52 subject to fluid pressure in reservoir passage 18 is less than the pressure working area of the opposite side of the valve 52 subject to supply line pressure through port 44a, the difference being that portion of the left face of valve 52 enclosed within the outer periphery of the end 48e of the body 48. Thus, emergency operation of the valve 52 (slidable movement to the right) is dependent upon a percentage drop in supply line pressure relative to existing pressure in reservoir passage 18, the selected percentage being governed by the selected diameter of the end 48e of the body 48. The return spring 56 is of a rating selected to merely overcome friction.

The above described emergency valve arrangement is considered an improvement over conventional arrangements in simplicity and reliability.

A further advantage is derived from its unit construction as a replaceable cartridge. To service the valve mechanism it is necessary merely to disconnect the control line 11 and remove the emergency valve cartridge. All other remaining lines, including the brake cylinder lines 37a, the reservoir line 19 and the supply line 13 need not be disturbed. Also, if desirable, an extra cartridge may be carried in the vehicle for immediate replacement in the event of failure, and the used cartridge returned to the shop for repairs.

In combination with the remainder of the relay valve above described, the emergency valve cartridge forms a compact relay unit in which the expendible valve elements are readily serviceable or replaced.

To service the supply valve, the supply valve cartridge can be removed as a unit and replaced without disconnecting a single line from the relay.

Also, in neither of the above mentioned service operations need the relay housing itself be unbolted from the vehicle and disassembled.

While I have shown and described a preferred embodiment of my invention, it will be obvious to those skilled in the art that various changes and modifications can be made without departing from my invention in its broader aspects and I, therefore, aim in the appended claims to cover all such changes and modifications as fall within the true spirit and scope of my invention.

What I claim as new and desire to secure by Letters Patent of the United States is:

1. In an air relay valve having a hollow housing, an exhaust valve means comprising an annular member having an apertured hub portion, an annular flexible diaphragm having its outer periphery secured to said housing and its inner periphery secured to said hub to define in said housing a control chamber adapted to receive a selectively variable fluid pressure and reaction chamber adapted to receive fluid under pressure, a guide-member for slidably receiving said hub and apertured to atmosphere, said annular member having a face radially apertured to communicate through said guide-member to atmosphere and define an exhaust passage, said diaphragm having a larger diameter than said annular member to present an intermediate portion of said diaphragm engageable with said face to act as valve means for exhausting fluid pressure from said housing through said exhaust passage responsive to fluid differential pressure on said diaphragm.

2. In an application and release valve device an improved release valve means comprising a housing, a hollow apertured guide-member providing communication to atmosphere, an annular member having a hub portion mounted on said guide-member, and a passage through said hub communicating with said hollow guide-member and terminating in a plurality of radially disposed ports in one side of said annular member, and an annular flexible diaphragm having its inner and outer periphery fixed respectively to said hub and said housing to define a control chamber adapted to receive a variable fluid pressure and a reaction chamber, an intermediate portion of said diaphragm being engageable with said annular member to act as a valve to open and close progressively the port area of said passage responsive to fluid differential pressure on said diaphragm obtained from said control and reaction chambers.

3. An air relay comprising in combination a body and cover forming a hollow housing, an annular flexible diaphragm having its outer periphery secured to said housing to define therein a control chamber and a reaction chamber, the housing having passageways therein to admit fluid to said control chamber from a source of variable fluid pressure, said body having an inlet passageway for admitting fluid to said reaction chamber from a source of fluid pressure, a centrally disposed exhaust port for exhausting fluid from said reaction chamber, a delivery port for delivering from said reaction chamber a relay controlled fluid pressure, a supply valve cartridge detachably secured in the housing through said exhaust port including a hollow elongated member open at one end and radially apertured adjacent its closed end, a valve actuator secured to the inner periphery of said diaphragm and having an apertured hub portion slidably positioned on said guide-member, an annular valve seat formed on the body between said inlet passage and said reaction chamber and concentric with said guide-member, an annular supply valve slidably positioned on a portion of said guide-member of lesser diameter than the diameter of said valve seat selected to provide a minimum desirable closing force on said supply valve responsive to differential pressure in said inlet passage and said reaction chamber, said valve actuator having a passage therein communicating to atmosphere through said guide-member and terminating in radially disposed exhaust apertures in one face of said actuator, said diaphragm being responsive to prevailing pressure in the control chamber to close said exhaust apertures and slide said actuator to engage and open said supply valve against said minimum force and upon prevailing pressure in said reaction chamber to raise the diaphragm from said actuator to progressively open the apertured area of said radially disposed exhaust apertures.

4. In an air relay valve, the combination of a housing presenting delivery port means and a supply port, a control port and an exhaust port adapted for communication, respectively, with a source of a relatively constant pressure, a controlled variable pressure and the atmosphere, a reservoir chamber formed in said housing and communicating with said supply port, an annular valve seat formed by said housing and disposed between said reservoir chamber and said delivery port means, a supply valve cartridge positioned in said body and detachably connected adjacent said exhaust port, said cartridge including a supply valve element biased to a normally closed position in engagement with said valve seat, actuator means for moving said valve element relative to said valve seat and for controlling the exhaust of fluid pressure from said housing through said exhaust port including an annular valve having exhaust apertures in one face thereof communicating through said cartridge with said exhaust port, said actuator being slidable on said supply valve cartridge to engage and open said inlet valve, a flexible diaphragm secured to said housing and said actuator to define a control chamber in said housing, said diaphragm being engageable with said actuator face to act as exhaust valve means, and emergency valve means communicating with said supply and control ports and with said control port and being responsive to loss of fluid pressure at said supply port for isolating said housing from said supply and control ports and for by-passing fluid under pressure from said reservoir chamber to said control chamber to open said valve element and close said exhaust valve means, said emergency valve means being supported in said housing and detachably connected as a unit adjacent said supply port.

5. An air relay valve comprising a hollow housing, an exhaust valve means including an annular member having a hub portion, an annular flexible diaphragm having its outer periphery secured to said housing and its inner periphery secured to said hub to define in said housing a control chamber adapted to receive a selectively variable fluid pressure to move said hub portion in one direction and a reaction chamber adapted to receive fluid under pressure to move said hub portion in the other direction, said reaction chamber forming an annular valve seat in alignment with said hub portion, a guide-member extending through said valve seat and slidably receiving said hub, said guide-member forming an exhaust passage open to atmosphere, an annular normally closed intake valve slidably mounted on said guide-member to move into and out of engagement with said valve seat in response to movement of said hub for controlling admission of air to said reaction chamber, said annular member having a face portion radially apertured to form ports communicating with said exhaust passage, said diaphragm having an intermediate portion engageable with said face portion to act as a valve to open and close progressively the area of said ports for exhausting fluid pressure from said housing through said exhaust passage in response to a difference in fluid pressure in said control and reaction chambers.

6. In an air relay valve, the combination of a housing forming a control chamber adapted to receive a controlled pressure and a reaction chamber adapted to deliver a supply of air, a reservoir chamber formed in said housing and communicating with said reaction chamber, a valve housing formed integrally with said housing and in communication with said reservoir chamber and having an inlet port for receiving a relatively constant supply of air, an elongated valve cartridge detachably supported in said housing and having one end affording a control port for receiving a manually controlled supply of air, said valve cartridge having a hollow body portion open at opposite ends to communicate with said inlet and control ports, respectively, and having an intermediate portion communicating with said control chamber, opposite ends of said hollow body portion forming valve seats, a control valve element movable relative to one of said valve seats to control the admission of air from said control port to said hollow body portion, a supply valve element movable relative to the other of said valve seats to control the admission of air from said inlet port to said hollow body portion, said valve elements being connected together to move as a unit to simultaneously close one of said valve elements and to open the other of said valve elements, said supply valve element having flexible portions engaging walls of said valve housing to permit flow of air in one direction from said inlet port for all positions of said supply valve element, said supply valve element being movable in response to pressure in said reservoir chamber upon failure of a supply of air at said inlet port to move said control valve element to a closed position and admit air from said reservoir chamber to said hollow body portion and said control chamber to automatically actuate said relay valve.

7. An air relay for delivering a controlled fluid pressure, the combination of a hollow housing forming a reservoir passage having a supply of air, an elongated emergency valve chamber communicating with said reservoir passage, and a centrally disposed exhaust port, said emergency valve chamber having its opposite ends apertured to provide a supply port adapted to receive a supply of air under pressure and a control port adapted to receive a variable pressure, a supply valve cartridge detachably secured in said body through said exhaust port including a hollow elongated guide-member open at one end and radially apertured adjacent its other end, a valve actuator having an apertured hub portion slidably positioned on said guide-member, an annular flexible diaphragm having its outer periphery connected to said housing and its inner periphery fixed to said actuator to define in said housing a control chamber communicating with said emergency valve chamber and a reaction chamber having a delivery port, said body having an annular lip separating said reaction chamber from said reservoir passage to form an annular supply valve seat concentric with said guide-member, an annular supply valve slidably positioned on a portion of said guide-member in fluid sealing relation therewith to engage said valve seat, the relative diameters of said portion and said valve seat being selected to provide a minimum desirable closing force on said supply valve responsive to differential pressure in said reservoir passage and reaction chamber, said valve actuator having a passage therein communicating to atmosphere through said guide-member and terminating in radially disposed exhaust apertures in one face of said actuator, said diaphragm being responsive to prevailing pressure in said control chamber to engage and close said exhaust apertures and move said actuator to engage and open said supply valve against said minimum closing force and upon prevailing pressure in said reaction chamber to raise said diaphragm from said actuator to progressively open the aperture area of said radially disposed exhaust apertures, an emergency valve cartridge comprising a hollow body adapted for detachable connection adjacent said control port and valve means mounted on said cartridge and cooperative therewith and with said housing for passing air from said supply and control ports to said reservoir passage and said control chamber, respectively, for normal operation and for sealing off said supply and control ports from the remainder of said housing and by-passing air from said reservoir passage to said control chamber on loss of pressure in said supply line.

8. An air relay comprising a hollow body having a reservoir passage adapted for connection to a source of air, an elongated emergency valve chamber having opposite open ends forming a control port and a supply port and communicating with said reservoir passage, a centrally disposed exhaust port and delivery ports formed in said housing, a hollow elongated guide-member detachably secured in said body through said exhaust port, said guide-member being open to atmosphere at one end and radially apertured adjacent its closed end, a valve actuator having an apertured hub portion slidably positioned on said guide-member and a passage therein communicating to atmosphere through said guide-member and terminating in radially disposed exhaust apertures in one face of said actuator, an annular flexible diaphragm fixed to said body and said actuator to define a control chamber and a reaction chamber in said body, said reaction chamber communicating with said delivery ports, an annular valve seat formed in said body between said reservoir passage and said reaction chamber concentric with and spaced from said guide-member, an annular supply valve slidably positioned on said guide-member for movement into engagement with said seat in response to differential pressure in said reservoir passage and reaction chamber, said diaphragm being movable in response to prevailing pressure in said control chamber to close said exhaust apertures and slide said actuator to engage and move said supply valve from said seat against said differential pressure and in response to prevailing pressure in said reaction chamber to raise said diaphragm from said actuator to progressively open the aperture area of said radially disposed exhaust apertures, an emergency valve cartridge comprising a hollow body detachably fixed in said emergency valve chamber through said control port, means for connecting said emergency valve body to a supply of variable control pressure, means for connecting said supply port to a source of normally constant pressure, and valve means mounted on said body and cooperative therewith and with said body for passing supply air and control air to said reservoir and said control chamber, respectively, for normal operation and for closing said supply and control ports and passing air from said reservoir passage to said control chamber upon loss of pressure at said supply port.

9. An air relay comprising a hollow housing forming an air reservoir passage for containing a supply of air and including fluid pressure delivery ports and an exhaust port, supply valve means for passing fluid under pressure from said reservoir passage to said delivery ports comprising a supply valve cartridge detachably accommodated in said body and including a normally closed inlet valve, differential pressure responsive means for opening said inlet valve and for controlling the exhaust of fluid pressure through said exhaust port including an annular valve actuator slidable on said supply valve cartridge to engage said inlet valve and a flexible diaphragm secured to said housing and to said actuator to define a control chamber and a reaction chamber, said diaphragm being responsive to prevailing pressure in said control chamber to close said exhaust port and open said inlet valve and responsive to prevailing pressure in said reaction chamber to release said inlet valve to a closed position and open said exhaust port, a valve chamber formed integrally with said housing and in communication with said control chamber and said reservoir, said valve chamber forming a supply port adapted to receive a supply of air and a control port adapted to receive a variable supply of air, emergency valve means disposed in said valve chamber between said supply and control ports for passing air from said control port to said control chamber under normal operation and responsive to loss of fluid pressure at said supply port to close said supply and control ports and pass air under pressure from said reservoir passage to said control chamber.

10. A fluid pressure operated relay having a hollow body, means within said body having a radially disposed exhaust valve seat communicating through said body to atmosphere, a cover secured to said body, a flexible diaphragm having its marginal portions clamped between said body and cover and normally contacting said exhaust valve seat, said diaphragm defining in said relay a control chamber adjacent said cover and a reaction chamber, a normally closed supply valve means arranged for operation by said diaphragm, and means for admitting selectively variable fluid pressure to said control chamber to open said supply valve to admit fluid pressure to said reaction chamber responsive to prevailing fluid pressure in said control chamber and to move the diaphragm to uncover said radially disposed exhaust valve seat progressively and to an extent dependent upon the value of prevailing differential pressure in said reaction chamber.

11. In a fluid pressure operating relay comprising a hollow housing, a flexible diaphragm fixed to said housing and dividing the latter into a control chamber and a reaction chamber, a normally closed supply valve connected to said diaphragm to be actuated thereby, means for admitting a manually controlled fluid pressure to said control chamber, and means for passing relay regulated fluid pressure from said reaction chamber, an improved exhaust valve means comprising a member having a face engageable by said diaphragm with radially disposed apertures in said face communicating through said housing to the atmosphere, said diaphragm being responsive to predominant pressure in said reaction chamber to uncover progressively a portion of said apertures dependent upon the valve of said predominant pressure.

References Cited in the file of this patent

UNITED STATES PATENTS

| | | |
|---|---|---|
| 2,168,748 | Leukhardt | Aug. 8, 1939 |
| 2,411,406 | Affleck | Nov. 19, 1946 |
| 2,441,050 | Wiegers | May 4, 1948 |
| 2,490,420 | Davis | Dec. 6, 1949 |
| 2,493,449 | Fitch | Jan. 3, 1950 |
| 2,577,967 | Hughes | Dec. 11, 1951 |